United States Patent [19]

Boldt et al.

[11] 4,340,886

[45] Jul. 20, 1982

[54] BEARING AND MOTOR TEMPERATURE MONITOR

[75] Inventors: Robert R. Boldt, Taylor Ridge, Ill.; Arthur R. Nelson, Davenport, Iowa

[73] Assignee: Dickey-john Corporation, Auburn, Ill.

[21] Appl. No.: 921,489

[22] Filed: Jul. 3, 1978

[51] Int. Cl.³ .................... G01K 1/02; G08B 19/00
[52] U.S. Cl. .................... 340/682; 340/502; 340/506; 340/518; 340/525; 340/595; 340/652; 340/693; 340/715; 374/153; 374/167
[58] Field of Search ............. 340/502, 518, 520, 525, 340/584, 595, 652, 636, 682, 715, 693, 506, 507; 73/340, 342, 359 A, 362 SC

[56] References Cited

U.S. PATENT DOCUMENTS

| | | | |
|---|---|---|---|
| 2,407,361 | 9/1946 | Wilson | 340/518 X |
| 2,696,604 | 12/1954 | Markow et al. | 340/525 X |
| 2,883,651 | 4/1959 | Akerlund | 340/518 |
| 3,469,252 | 9/1969 | Bet | 340/715 |
| 3,548,396 | 12/1970 | Roberts | 340/595 |
| 3,665,399 | 5/1972 | Zehr et al. | 340/518 X |
| 3,722,283 | 3/1973 | Treharne et al. | 73/362 SC |
| 3,791,217 | 2/1974 | Stout et al. | 73/362 SC X |
| 3,866,166 | 2/1975 | Kerscher et al. | 340/518 X |
| 3,973,184 | 8/1976 | Raber | 340/652 X |
| 3,988,730 | 10/1976 | Valker | 340/518 X |
| 3,996,451 | 12/1976 | Harrington et al. | 73/362 SC X |
| 4,010,456 | 3/1977 | Erni | 340/636 |
| 4,038,532 | 7/1977 | Burris et al. | 73/362 SC X |
| 4,074,575 | 2/1978 | Borgman et al. | 340/682 X |
| 4,102,194 | 7/1978 | Eng | 73/342 X |
| 4,146,884 | 3/1979 | Kurn | 340/520 X |

Primary Examiner—John W. Caldwell, Sr.
Assistant Examiner—Joseph E. Nowicki
Attorney, Agent, or Firm—Trexler, Bushnell & Wolters, Ltd.

[57] ABSTRACT

A system for monitoring the temperature of a plurality of bearings and motors, for example in a grain elevator, includes a plurality of sensors associated with the respective bearings and motors whose temperatures are to be monitored. A first circuit energizes a display for providing a readout of the temperature at each sensor location, and a second circuit compares the temperature at each sensor with a maximum desired temperature for its associated bearing or motor, and energizes an alarm when this desired maximum is exceeded. A third circuit drives a display indentifying the sensor being monitored by the first and second circuits. A malfunction detector circuit produces an observable indication in response to an open circuit condition at any of the sensors. The sensors each comprise a temperature sensitive diode and a matching resistor encased in a housing by a highly thermally conductive material, the housing being suitably formed to be mounted in a close thermal relationship with the motor or bearing to be monitored.

12 Claims, 9 Drawing Figures

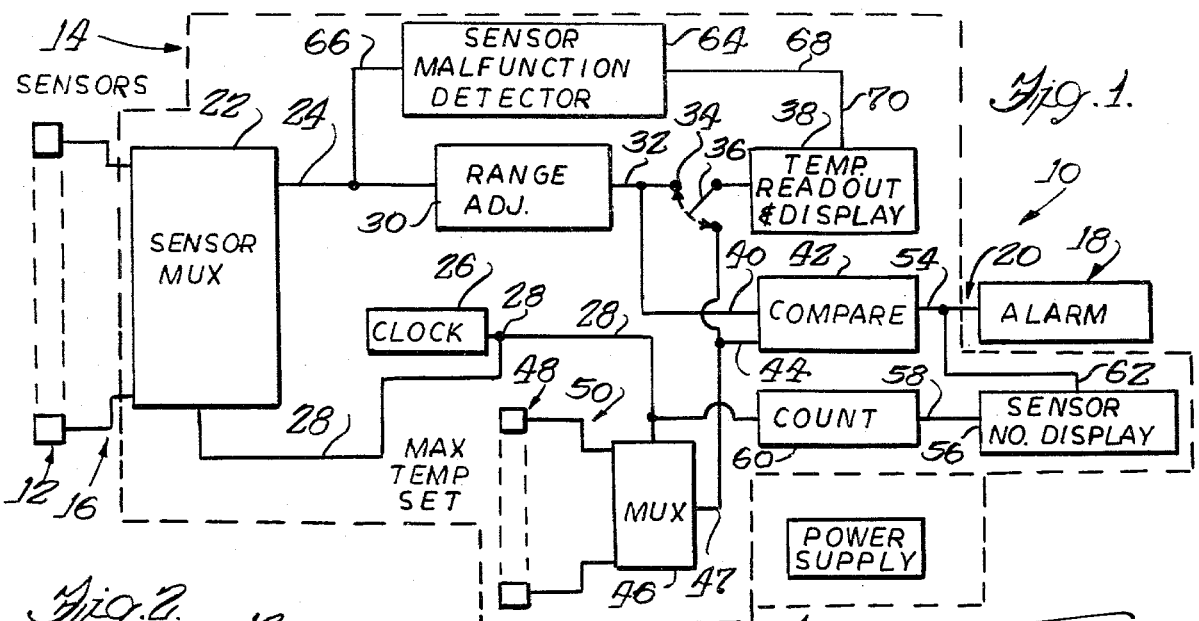
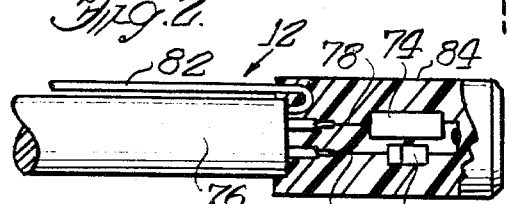
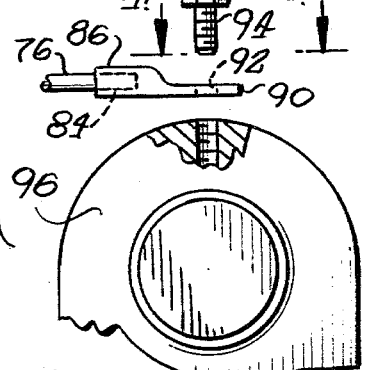
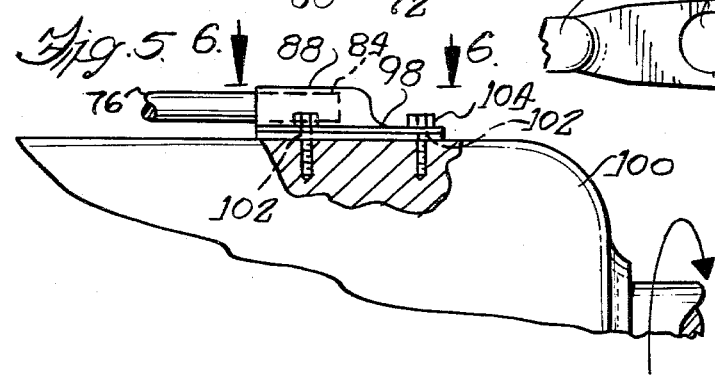
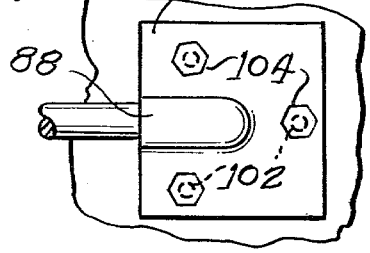
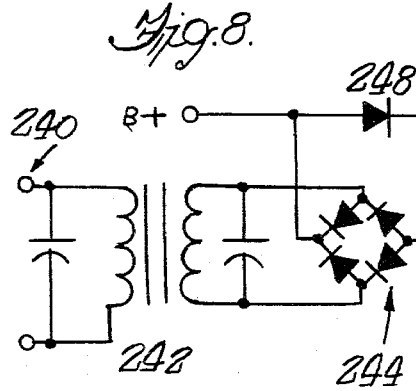

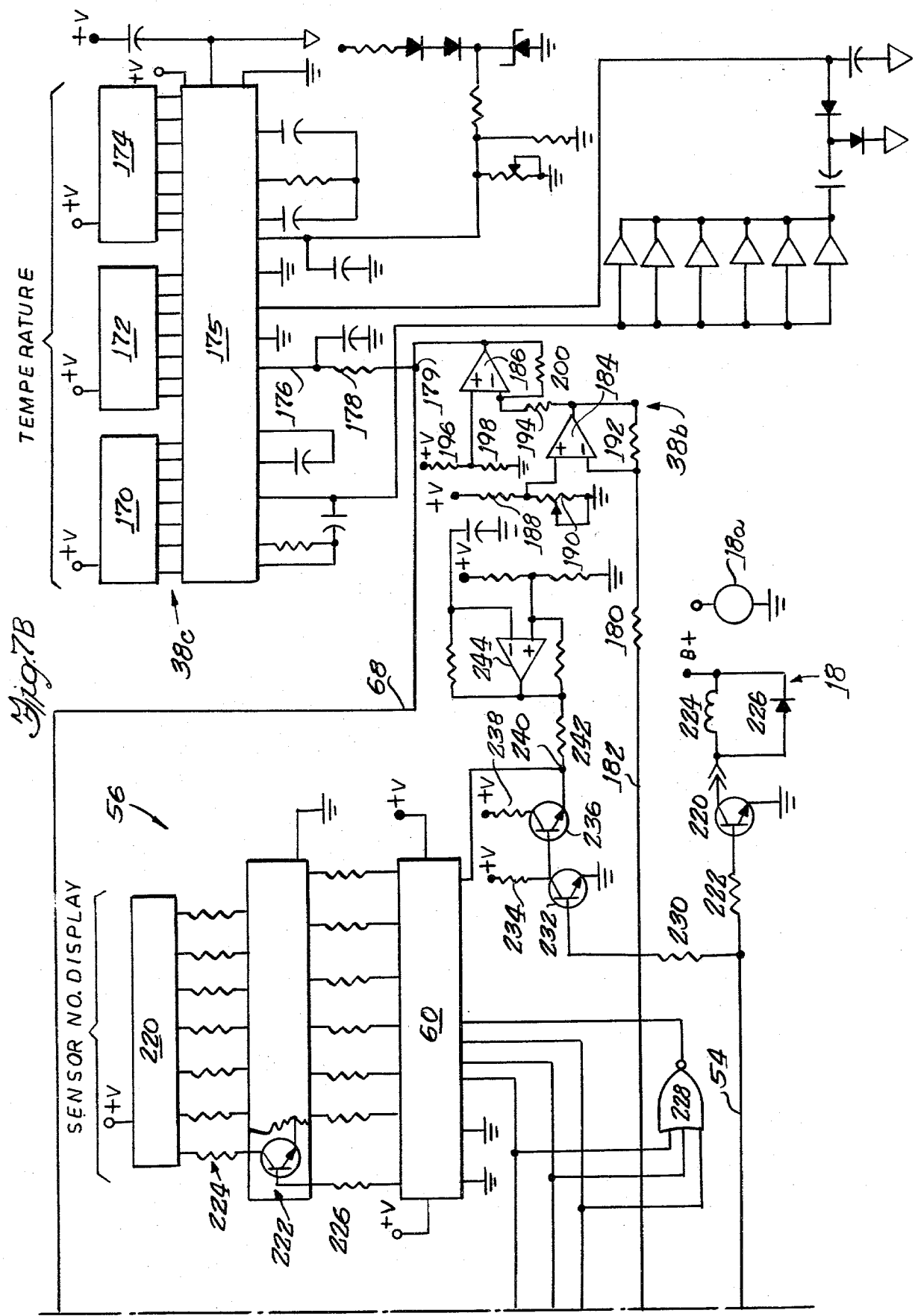

BEARING AND MOTOR TEMPERATURE MONITOR

BACKGROUND OF THE INVENTION

The present invention is directed generally to temperature monitoring and more specifically to monitoring the temperatures of a plurality of bearings and/or motors in a grain elevator.

It is generally useful and desirable to monitor the temperatures of such motors and bearings, to insure against excessive temperatures thereof, which may be indicative of a need for lubrication or the like, and may seriously impede the proper performance or even materially decrease the useful life thereof. In a potentially volatile or explosive environment such as found in a grain elevator, monitoring for excessive temperatures on such motors or bearings therein, as may be associated with movable elements such as conveyor belts or the like, is further desirable as a safety measure.

In such an installation, it is further desirable to provide temperature sensors having substantially identical temperature response characteristics. Moreover, the temperature sensor structure should be readily attachable to the motor or bearing members to be monitored, forming a reliable thermal conductive path between the motor or bearing and the temperature sensing elements.

OBJECTS AND SUMMARY OF THE INVENTION

Accordingly, it is a general object of this invention to provide a new and improved bearing and motor temperature monitoring system.

A more specific object is to provide a temperature monitoring system in accordance with the foregoing object which is capable of monitoring the temperatures at a plurality of such bearings and/or motors.

Another object is to provide a temperature monitoring system in accordance with the foregoing objects, which is further adapted to provide a selectable maximum temperature for each element to be monitored, and provide an observable indication when such maximum temperature is exceeded at the associated monitored element.

Yet another object is to provide a temperature monitor in accordance with the foregoing objects which is further adapted to detect an output malfunction condition in a sensor or in the lines joining the sensors with a central console, and provide an observable indication thereof.

Still another object of this invention is to provide a temperature monitor in accordance with the foregoing objects wherein the temperature sensors are matched so as to exhibit substantially identical temperature response characteristics, and the temperature sensor structures are adapted for relatively simple yet reliable installation upon a motor or bearing, so as to maintain a thermal path between the motor or bearing whose temperature is to be monitored, and the temperature sensing elements of the sensor structure.

Other objects, features and advantages of the invention will become more readily apparent upon consideration of the following detailed description, together with the accompanying drawings.

BRIEF DESCRIPTION OF THE DRAWINGS

In the drawings:

FIG. 1 is a block diagram illustrating the temperature monitor of the present invention;

FIG. 2 is a side elevation, partially broken away, of a portion of a temperature sensor, constructed in accordance with the principles of the invention;

FIG. 3 is an exploded side elevation, illustrating a temperature sensor of the type shown in FIG. 2 embodied as a bearing temperature sensor and being mounted in conjunction with a bearing;

FIG. 4 is a view taken generally along the line 4—4 of FIG. 3;

FIG. 5 is a side elevation, partially broken away, illustrating a temperature sensor of the type shown in FIG. 2, embodied as a motor temperature sensor, and mounted on a motor;

FIG. 6 is a view taken generally along the line 6—6 of FIG. 5;

FIGS. 7A and 7B taken together, illustrate an electronic circuit portion of the temperature monitor of this invention, in circuit schematic form; and FIG. 8 illustrates an exemplary power supply circuit for the circuits of FIGS. 7A and 7B, also in circuit schematic form.

DETAILED DESCRIPTION OF THE ILLUSTRATED EMBODIMENT

Figure 7A:
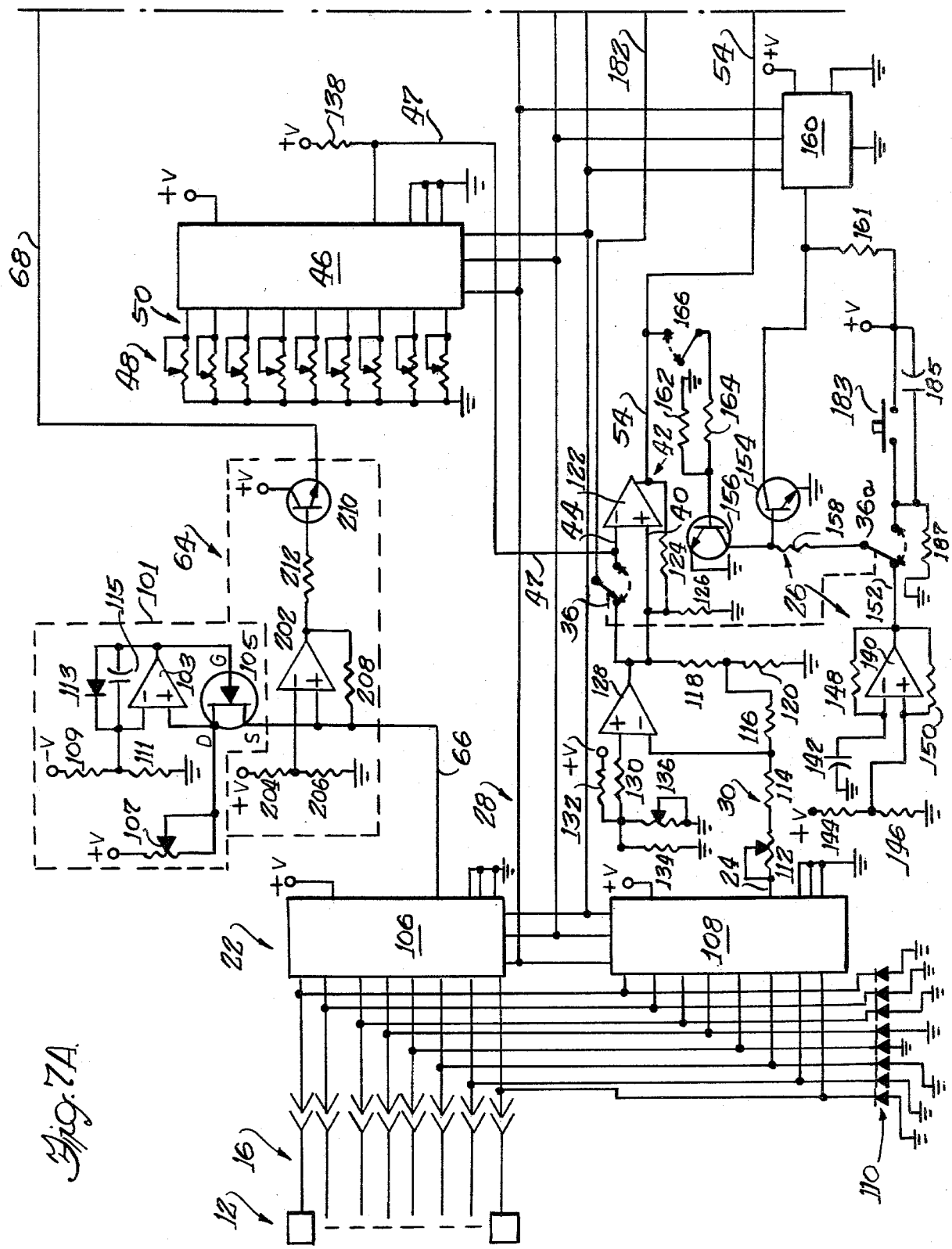

Referring now to the drawings, and initially to FIG. 1, there is seen a temperature monitoring system, designated generally 10, in accordance with this invention. In accordance with a preferred embodiment, the temperature monitoring system 10 is suitable for monitoring the temperatures of a plurality of bearings and motors, as might be found on conveyor belts or the like, in a grain elevator or in a grain processing plant. Broadly speaking, the monitoring system 10 includes a plurality of sensors, designated generally 12 which are disposed in close thermal contact with motors and/or bearings whose temperatures are to be monitored. The remaining components of the system 10 comprise a monitor console, designated generally 14, which may be conveniently mounted remotely of the sensors 12 and coupled thereto by means of suitable wires or cables designated generally 16, for control and observation by an operator. One or more alarm means, designated generally 18 may be mounted remotely of the monitoring console 14 and coupled thereto by suitable wire or cable 20, to provide audible and/or visual indications, as will be more fully described hereinbelow.

Turning now to the monitoring console 14, it will be appreciated that the basic functional units for carrying out the temperature monitoring functions of this system 10 are included therein. In this regard, a sensor scanning or multiplexing circuit means 22 receives the coupling lines or cables 16 from each of the plurality of sensors 12, and sequentially and repeatedly scans the lines 16 to effect operative connection of the lines 16 associated with each sensor 12 with an output line 24. A clock or timing circuit 26 provides suitable control signals to the sensor scanning or multiplexing circuit 22 via a control line 28, to effect the sequential and repeated scanning of sensors 12. The selected sensor output signal on the line 24 is fed to a range adjust or scaling circuit 30, which produces at its output line 32 a signal corresponding to the temperature at the selected sensor 12, in a form suitable for feeding the following circuits. The line 32 feeds a circuit point 34 which is selectively coupled via a switch 36 to a temperature readout and display circuit 38. This temperature readout and display circuit 38 receives the signal provided thereto at the circuit point 34, when the switch 36 is actuated into contact therewith, and produces therefrom a suitable observable indication of the temperature at the selected sensor 12, preferably in the form of a digital display. The line 32 also feeds an input 40 of a comparing circuit 42 which compares this signal with a second signal input thereto at a line 44. The signal on this line 44 is received from a second multiplexing or scanning circuit means 46, which scans a plurality of temperature selecting or setting circuits 48. These temperature set circuits 48 are preferably equal in number with the sensors 12, such that each may be utilized to produce a signal output on its associated output line 50 corresponding to the maximum desired temperature for the associated sensor 12. More specifically, this signal on line 50 represents a maximum desired temperature for the bearing or motor at which the associated sensor 12 is situated. The multiplexer or scanning circuit 46 also receives the clock or control signal on the line 28 from the clock 26. This is the same control signal fed on the line 28 to the multiplexer or scanning circuit 22, whereby the two multiplexing or scanning circuits 22 and 46 operate simultaneously. Consequently, the temperature signal from each sensor 12 and its associated maximum desired temperature signal, as set by the associated circuit 48, are simultaneously fed to the two inputs 40 and 44 of the comparator or comparing circuit 42. Cooperatively, the comparing circuit 42 produces a suitable signal on its output line 54 for feeding the cable 20 to actuate the alarm means 18 whenever the temperature at the selected sensor meets or exceeds the desired maximum temperature as set by its associated maximum temperature setting circuit 48, as determined by the comparison of the corresponding signals at the inputs 40 and 44 thereof.

The console 14 also includes a sensor identification or sensor number display means 56. This display means 56 receives an input on a line 58 from a counter or counting circuit 60 which is driven by the clock signal on the line 28. Consequently, the counter will be seen to operate simultaneously with the multiplexer or scanning circuits 22 and 46, thus producing a count at its output line 58, corresponding to the identity of the sensor 12 selected by the sensor scanning or multiplexer circuit 22. Accordingly, the sensor number or identification display 56 produces an observable indication, preferably in digital form, of the particular sensor being monitored at a given time. Advantageously, the comparator circuit output on the line 54 is also fed to a control input 62 of the sensor number display 56, so as to produce a further observable indication corresponding to the temperature at the selected sensor meeting or exceeding the maximum temperature set therefor as described above. This further observable indication will be described more fully hereinbelow.

In accordance with a feature of the invention, the output 24 of the sensor multiplexer or scanning circuit 22 also feeds a sensor malfunction detection circuit 64, which consequently receives at its input 66 the output of each sensor 12, as selected by the multiplexing or scanning circuit 22. This sensor malfunction detector circuit 64 produces a control signal on a output line 68 in response to sensing or detecting an open circuit condition on its input 66. This signal on line 68 feeds a control input 70 of the temperature readout and display circuit 38, for producing an observable malfunction indication thereon, which will be more fully described hereinbelow. It will be appreciated that an open circuit condition at the input 66 of the malfunction detector circuit 64 may be due to a broken or open circuited sensor 12, or to a broken or open circuited cable 16 connecting a particular sensor 12 with the monitoring console 14.

Turning now to FIGS. 2 through 5, a typical sensor 12, constructed in accordance with features of the present invention will be described in additional detail. Referring initially to FIG. 2, a sensor unit or structure 12 is illustrated without its housing, which will be more fully described with reference to FIGS. 3 through 6. The sensor structure 12 includes a temperature sensitive diode 72 which, when fed with a constant current develops a voltage thereacross which is linearly proportional to temperature. Advantageously, the diode 72 is joined in series with a selected resistor 74. This resistor 74 is selected for the diode 72 of each sensor 12, so that the resultant output voltages developed across these series connected components is matched for all of the sensors 12. That is to say, the resistors 74 are selected such that all of the sensors 12 exhibit the same linear with temperature voltage variation thereacross, or are "matched." A suitable shielded cable 76 has a pair of leads 78, 80 connected in series circuit with the diode 72 and resistor 74. These leads 78 and 80 then form the connecting leads or cables 16 illustrated in FIG. 1.

In accordance with a feature of the invention, the electrically joined diode 72, resistor 74 and leads 78 and 80 are suitably encased or "potted," together with an end portion of the shielded cable 76. It will be noted that a conventional shielding braid or lead 82 is fed outwardly of potting material 84, available for grounding in conventional fashion. Advantageously, the potting material 84 comprises a casting resin of high thermal conductivity, for example of the type designated Stycast 2851 FT, manufactured by Emerson & Cumming, Inc. Canton, Mass. With reference to FIGS. 3 and 5, it will be seen that the potting or encasing of the described components takes place within suitable housings, designated 86 in FIGS. 3 and 4, and designated 88 in FIGS. 5 and 6. These housings 86 and 88 are adapted for relatively simple attachment to a bearing or motor, whose temperature is to be monitored. Referring initially to FIG. 3, in this regard, the housing 86 preferably comprises a generally tubular metallic member for receiving the end portion of the cable 76, together with the diode 72 and resistor 74 in series circuit with the leads 78 and 80. Thereafter the potting or casting material 84 is introduced thereinto in liquid state, so that upon hardening of the material 84, the foregoing components are firmly encased in, and in good thermal contact with, the housing 86. This housing 86 is preferably of copper, to insure a reliable thermal conductive path through the housing and casting material 84 to the temperature sensitive diode 72. The housing 86 includes an outwardly extending flange 90 which bears an aperture 92 of suitable dimension for receiving a fastener 94 for attachment to a bearing 96 whose temperature is to be monitored. Preferably, a conventional threaded grease fitting of the bearing 96 serves as the fastener 94, whereby a good thermal path is obtained from the bearing 96 to the temperature sensitive diode 72. Referring now to FIG. 5, a substantially similar housing 88 receives the components of FIG. 2, in the same manner as described above for the housing 86. This housing 88, also preferably of copper, is provided with a similar outwardly extending flange 98, specifically adapted for attachment to a motor 100 whose temperature is to be monitored. In this regard, and referring also to FIG. 6, it will be seen that the flange 98 is formed with suitable apertures 102 for receiving fasteners 104 to effect attachment to the motor 100. Preferably, the fasteners 104 comprise conventional self-tapping screws, whereby the outer housing or casing of the motor 100 may be readily drilled or otherwise provided with suitable apertures to receive the screws 104. Thus, firm mechanical connection is assured, and also a good thermal path is obtained between the motor 100 and the temperature sensitive diode 72.

Referring now to FIGS. 7A and 7B, the monitoring console components 14 are illustrated in circuit schematic form. The sensor multiplexing or scanning circuit 22 comprises a pair of eight-line-to-one-line multiplexers 106 and 108 which receive paralleled input lines 16 from the sensors 12, which in the illustrated embodiment are eight in number. The multiplexer 106 feeds the input line 66 to the sensor fault detector circuit 64, while the multiplexer 108 feeds the input line 24 to the range adjusting circuit 30 and following circuits. In the illustrated embodiment the multiplexers 106 and 108 comprise integrated circuit analog multiplexers of the type generally designated 4051. The multiplexer control lines 28 are three in number and feed control inputs of the multiplexers 106 and 108 from the clock circuit 26. In operation, the multiplexer 106 sequentially and repeatedly feeds a constant current on the order of one milliampere to the sensors 12, via the lines 16, each of which has a suitable diode 110 associated therewith and running to ground.

This one milliampere constant current is provided on the line 66 by a circuit designated generally 101 which includes an operational amplifier 103 and an FET 105. The gate electrode G of the FET 105 is fed from the output of the op amp 103 and its drain electrode D is joined to one input thereof. The drain electrode D is also joined with a potentiometer 107 whose free end is connected to a positive voltage supply. The opposite input of operational amplifier 103 is connected to a junction of a pair of resistors 109 and 111 which form a voltage divider between a positive supply and ground. A diode 113 and capacitor 115 are connected in parallel circuit to provide a feedback path between the output of the operational amplifier 103 and its input at the voltage divider comprising resistors 109 and 111. The source electrodes of the FET feeds the line 66, thereby providing substantially one milliampere constant current source, which is sequentially and repeatedly fed via the multiplexer 106 to the individual sensors 12 as selected thereby.

Consequently, the voltage developed across the respective temperature sensors 12 in response to the temperatures thereat, is sequentially and repeatedly multiplexed through to the respective outputs 24 and 66 of the multiplexers 106 and 108. The resultant voltage signal on the line 24 is proportional to the temperature at the selected diode and is fed to the range adjusting circuit 30, comprising a potentiometer 112 in series with a suitable resistor 114. The output of this circuit is fed through a resistor 116 to the junction of a pair of resistors 118 and 120. The opposite end of resistor 120 is grounded. The opposite end of resistor 118 feeds the input 40 to the voltage comparing circuit 42 which comprises an operational amplifier 122. A feedback resistor 124 is provided between the input 40 and output 54 of the op amp 122, and a suitable biasing resistor 126 is provided between the input 40 and ground. The junction of resistors 114 and 116 also feeds one input of an operational amplifier 128 which forms a first stage of the temperature readout and display circuit 38. The opposite input of the operational amplifier 128 is provided with a suitable reference voltage for scaling the output thereof, via a series connected resistor 130, whose other end is connected to the junction of a resistor 132, in series with a positive voltage supply, with the parallel combination of a resistor 134 and a scaling potentiometer 136, whose free ends are connected to ground.

Referring again to the voltage comparator op amp 122, its opposite input 44 is fed from the output of the multiplexer 46, which in the illustrated embodiment also comprises an integrated circuit analog multiplexer of the type generally designated 4051. Advantageously, the multiplexer 46 receives the same control input lines 28 as the multiplexers 106 and 108, whereby it is operated to scan its inputs simultaneously therewith. The inputs 50 of the multiplexer 46 are fed from a plurality of potentiometers 48 which comprise the maximum desired temperature setting circuits, and have their free ends tied in common to ground. Accordingly, the multiplexer 46 operates to sequentially and repeatedly feed a constant current to each of the potentiometers 48 on the lines 50, and deliver the voltage signal developed thereacross to the output line 44, which is provided with a resistor 138 to a positive voltage supply. Accordingly, it will be appreciated that each of the potentiometers 48 is associated with or corresponds to one of the temperature sensors 12, whereby each may be separately adjusted to provide a maximum desired temperature signal for the associated temperature sensor 12. This then, accomplishes the selection of a maximum desired temperature setting for the respective motor or bearing at which the associated sensor 12 is located, in accordance with a feature of the invention.

The clock circuit 26, which feeds the control lines 28, comprises a conventional oscillator circuit including an operational amplifier 140 having a first input in series with a capacitor 142 to ground, and a second input at the junction of a pair of resistors 144 and 146 forming a voltage divider between a positive voltage supply and ground. A pair of feedback resistors 148 and 150 are provided between the respective inputs of the operational amplifier 140 and its output on a line 152. The line 152 feeds one terminal of a switch 36a, ganged with the switch 36, to operate in unison therewith. The switch 36a feeds the base electrode of a transistor 154 and the collector electrode of a transistor 156, through a series connected resistor 158. The collector electrode of the transistor 154 feeds a three stage binary counter 160, which in the illustrated embodiment comprises three stages of an integrated circuit twelve stage ripple carry binary counter of the type generally designated 4040. The emitter electrodes of transistors 154 and 156 are grounded. The base electrode of the transistor 156 is joined to the junction of a pair of resistors 162 and 164, the other end of resistor 162 being connected to ground and the other end of resistor 164 being connected to a switch 166 whose function will be more fully described later. With the switches 36a and 166 in the illustrated positions, the clock circuit 26 operates as follows: a clock frequency pulse at a selected rate is produced by the oscillator circuit comprising operational amplifier 140 and associated components and alternatively opens and closes the collector emitter path of transistor 154 to effect a pulse train at the same frequency or clock rate at the input of the counter 160. The counter 160 accordingly outputs a binary count on its three output lines 28 to simultaneously feed the multiplexers 46, 106 and 108, as described. When the switch 166 is actuated to its opposite position it receives the output on the line 54 on the comparator circuit 42. Thus, when the temperature at a selected sensor reaches or exceeds the maximum temperature set therefor at the associated potentiometer 48, a high or logic "1" signal is produced on the line 54 by operational amplifier 122. This high signal then causes transistor 156 to go into conduction, effectively grounding the base electrode of transistor 154, thereby effectively disconnecting the output of the oscillator from the counter 160. It will be appreciated that this effectively holds the multiplexers at the sensor at which the excessive temperature was detected, in effect "latching" the system on that sensor, and discontinuing the scanning action of the multiplexers 46, 106 and 108. This in turn, as will be more fully described below, effects a latching of the display on that sensor, thereby calling the operators attention to the excessive temperature detected at the bearing or motor at which that particular sensor is located. The operator may then actuate the switch 166 back to its illustrated position to continue the scanning of sensors, thereby acknowledging the excessive temperature condition.

Referring now to FIG. 7B, the display and alarm components and associated circuits are illustrated in additional detail. The temperature display comprises three conventional seven segment LED display elements 170, 172 and 174 which are driven by a counter/display-driver integrated circuit 175. This integrated circuit 175 comprises, in the illustrated embodiment, an integrated circuit component of the type generally designated 7107, which also includes an analog-to-digital converter. The elements 170, 172, 174 and 175 comprise a portion of the temperature readout and display 38, designated generally 38c. An input line 176 to the analog-to-digital converter portion of the integrated circuit 175 is fed through a series resistor 178 from a circuit point 179. This circuit point 179 forms the output of a second portion of the temperature readout and display circuits 38 which is designated generally 38b. This circuit portion 38b is fed through a series resistor 180 from a line 182 which terminates at the switch 36. Consequently, when the switch 36 is in the position illustrated in FIG. 7A, the scaled signal output of the operational amplifier 128, proportional to the temperature at the sensor 12 selected by the multiplexer 108, is fed to the input of the circuit 38b.

Briefly, the circuit 38b comprises a pair of series connected operational amplifiers 184 and 186. The operational amplifier 184 receives at one input the signal from the resistor 180, and has its opposite input tied to the junction of a resistor 188 with a potentiometer 190 which form a voltage divider between a positive voltage supply and ground. The potentiometer 190 functions as a zero set point adjustment. A feedback resistor 192 is provided between the output of operational amplifier 184 and the input thereof from the resistor 180. The output of operational amplifier 184 feeds one input of the operational amplifier 186 via a series connected resistor 194. The opposite input of operational amplifier 186 is connected to the junction of a pair of resistors 196 and 198 which form a voltage divider between a positive voltage supply and ground. A feedback resistor 200 is coupled between the output of operational amplifier 186 and the input thereof at the resistor 194. The output of the operational amplifier 186 feeds the circuit point 179. Consequently, when the switch 36 is in the position illustrated in FIG. 7A the temperature signal is fed through operational amplifiers 184 and 186 to the input of the integrated circuit 175 where it is converted into suitable form for driving the digital displays 170, 172 and 174. In the illustrated embodiment, suitable calibration elements are joined as illustrated with the integrated circuit 175, to effect a display in hundreds, tens and units of the temperature corresponding to the signal received at the input 176 thereof.

In operation the maximum temperature settings may be chosen by actuating the switch 36 of FIG. 7A opposite the position illustrated. The line 182 is then fed from the output line 47 of multiplexer 46. Simultaneously, the switch 36a will be actuated opposite the terminal illustrated, thereby effectively disconnecting the oscillator circuit comprising operational amplifier 140 and associated components from the binary counter 160. In this position switch 36a effects connection of a switch 183 into circuit with the binary counter 160. This switch 183 may then be manually actuated, each actuation thereof pulsing transistor 154 and thereby advancing the counter 160 one count to correspondingly advance multiplexer 46 and display 22 by one count. In this regard, it will be seen that a positive voltage supply is connected to one terminal of the switch 183, and the opposite terminal thereof is joined by switch 36a in series with resistor 158 and the base of transistor 154. A further resistor 161 joins the same positive voltage supply point to the collector electrode of transistor 154. Also, a capacitor 185 is connected across the switch terminals of switch 183 and a suitable resistor 187 is connected between the common terminals of switches 36a and 183 and ground. Consequently, with the switches 36 and 36a in this latter position and the switch 166 in the position illustrated in FIG. 7A, the multiplexer 46 may be manually stepped to slowly present the signals from each of the maximum temperature setting potentiometers 48 to the display driver integrator circuit 175, so that their corresponding maximum temperature setting values may be read out thereon. In this fashion, the desired maximum temperature for each sensor 12 may be selected.

The circuit point 179 is also fed by the output line 68 of the sensor malfunction detector circuit 64. Referring again to FIG. 7A, this circuit 64 comprises an operational amplifier 202 which functions as a comparator. The output 66 of multiplexer 106 forms one input to the operational amplifier 202, while its opposite input is connected to the junction of a pair of resistors 204 and 206 which form a voltage divider between the positive supply and ground. A feed-back resistor 208 joins the output of the operational amplifier 202 with the line 66. The resistors 204, 206 and 208 are chosen such that the output of the operational amplifier 202 is at a logic "0" level unless the input on the line 66 is an open circuit condition, whereupon the output reverts to a logic "1" level. This output feeds the base electrode of a transistor 210 via a series connected resistor 212. The collector electrode of transistor 210 is connected to the positive supply and the emitter electrode thereof feeds the line 68. Accordingly, if a normal or "non-open circuit condition" exists at the line 66, the line 68 will be effectively switched off, so as to have no effect at the circuit point 179 of FIG. 7B. If however, an open circuit condition exists at the line 66, the transistor 210 will be biased into conduction, thus feeding a positive or logic "1" signal to the line 68 and circuit point 179. In response to this level of voltage, the analog-to-digital converter portion of integrated circuit 175 will cause a blanking of the display comprising elements 170, 172 and 174 thus providing an observable indication of a sensor malfunction. In this regard, it will be appreciated that an open circuit condition will be present on the line 66 if the sensor 12 presented thereto by multiplexer 106 is itself in an open circuit condition, or the connecting line or cable 16 associated therewith is in an open circuit condition.

Referring again to FIG. 7B, the sensor identification number display 56 comprises a conventional seven segment LED digital display element 220, each segment thereof being driven by a suitable transistor 222 via a series connected resistor 224. The transistors 222 are fed in turn from the counter circuit 60, via resistors 226, at their respective base electrodes. The counter circuit 60 is driven from the clock control lines 28 simultaneously with the multiplexer circuits 46, 106 and 108. Consequently, the count number reached by the counter 60 and indicated by the digital display 220 at any time comprises an identification number of the particular sensor simultaneously selected by the multiplexers 106 and 108. Counter 60, in the illustrated embodiment comprises an integrated circuit element of the type generally designated 4511. A three input NOR gate 228 receives the three control lines 28 and feeds the reset input of the counter circuit 60, to effect resetting thereof at the completion of an eight count cycle, as it will be remembered that the illustrated embodiment includes eight sensor elements 12.

In accordance with a further feature of the invention, the line 54 from the output of the comparator circuit 42 feeds the base electrode of an alarm circuit driver transistor 220 via a series connected resistor 222. The emitter electrode of transistor 220 is joined to ground while the collector electrode thereof is joined to one side of a coil 224 of a suitable relay (not shown) the opposite side of coil 224 being connected to a suitable positive voltage supply. A diode 226 is connected in parallel with coil 224. Accordingly, upon a logic "1" or positive output from the comparator 44, indicating a temperature at the selected sensor 12 in excess of the maximum desired temperature selected therefor at its associated potentiometer 48, the relay coil 224 will be energized, causing its associated relay to energize an alarm 18a.

In accordance with a further feature of the invention the line 54 is also joined via a series connected resistor 230 to the base electrode of a transistor 232 whose emitter electrode is connected to ground whose collector electrode is connected via a resistor 234 to a positive voltage supply. The collector electrode of the transistor 232 also feeds the base electrode of a transistor 236 whose collector electrode is connected via a series resistor 238 to a positive voltage supply and whose emitter electrode feeds a circuit point 240. This circuit point 240 is also fed from the output of an oscillator circuit via a series connected resistor 242. This oscillator circuit comprises an operational amplifier 244 and associated components substantially identical to the above described oscillator circuit comprising operational amplifier 140 and associated circuit components. Consequently, when the temperature at the selected sensor meets or exceeds the maximum desired temperature set therefor at the associated potentiometer 48, the logic "1" signal on line 54 will turn on transistor 232 thereby turning off transistor 236 and allowing the oscillator signal from operational amplifier 244 and associated components to feed circuit point 240, which is connected with a control input of the counter 60. This oscillator signal at the counter 60 will cause the digital display element 220 driven thereby to flash on and off, thereby giving additional observable indication of the sensor 12 which is at or in excess of its desired maximum temperature. Conversely, when the selected sensor is below its desired maximum, transistor 232 is "off". This turns transistor 236 on, holding circuit point 240 at a constant voltage, hence no oscillation or "flashing" display.

Referring briefly to FIG. 8 a suitable power supply for the circuits of FIGS. 7A and 7B is illustrated, and comprises, essentially, a conventional power supply. A pair of terminals designated generally 240 are fed from an AC line and form the inputs to the primary coil of a transformer 242 whose output is connected across a full wave rectifier circuit 244 in conventional fashion. The positive voltage output side of the full wave rectifier circuit 244 forms a B plus output of circuit and also feeds a first integrated circuit voltage regulator 246 via a series connected diode 248. A suitable smoothing capacitor 250 is joined between the input of the voltage regulator 246 and ground. The output of the voltage regulator 246 is also provided with a suitable smoothing capacitor 252 and feeds a first +V positive voltage supply output, which in turn feeds a second voltage regulator integrated circuit 254. This voltage regulator circuit 254 provides a second value positive voltage supply at its output, which is similarly provided with a suitable smoothing capacitor 256. In the illustrated embodiment, circuits 246 and 252 comprise integrated circuit components of the types generally designated LM340-12 and LM340-5, respectively.

Advantageously, the foregoing circuits effectively isolate or prevent any significant electrical power from reaching the potentially volatile interior of the grain elevator or grain processing plant where the sensors 12 are located. Further, in this regard, it will be appreciated that the one milliamp constant current supplied to the sensors 12, coupled with the described temperature sensing diode elements, which typically develop voltages thereacross on the order of 0.4 to 0.6 volts, represents a suitably low power electrical circuit for this environment. Also, the power supply circuit of FIG. 7 is preferably isolated by suitable enclosure from the low power circuit components in the console 14, as diagrammatically illustrated in dotted line in FIG. 1.

While a preferred embodiment has been illustrated and described herein, the invention is not limited thereto. On the contrary, various alternatives, changes and modifications may occur to those skilled in the art and are to be considered as forming a part of the present invention, as it is defined by the appended claims.

The invention is claimed as follows:

1. A bearing temperature monitor comprising sensor means mounted in thermal contact with each of a plurality of bearings whose temperature is to be monitored, circuit means responsive to said sensor means for producing first signals corresponding to the respective temperatures thereat, lines joining said sensor means with said circuit means, display means coupled with said circuit means for producing an observable indication of the temperatures at each sensor means and input fault detection circuit means having input means coupled with said joining lines and responsive to an open circuit condition at said input means for deactivating said display means, thereby indicating a fault condition at the associated sensor or joining line.

2. A monitor according to claim 1 wherein said sensor means comprises a plurality of sensor means each mounted for sensing the temperature at one of said plurality of bearings, wherein said circuit means comprises first multiplexer circuit means for sequentially and repeatedly scanning said sensor means and responsive to each sensor means for producing said first signal corresponding to the temperature sensed thereby, and further including a plurality of adjustable reference means, each associated with one of said sensor means and individually and selectively adjustable for providing a second signal having a value corresponding to a maximum desired temperature for the one of said bearings, at which the associated sensor means is mounted, second multiplexer circuit means for sequentially and repeatedly scanning said adjustable reference means in unison with said scanning by said first multiplexer circuit means of the associated sensor means, observable indicator means, and means responsive to said first signal and to said second signal for energizing said observable indicator means to produce a further observable indication.

3. A monitor according to claim 2, wherein said energizing means includes comparator means for comparing said first signal means with said second signal and energizing said indicator means to produce said further observable indication when the value of said first signal meets or exceeds the value of said second signal, thereby indicating a temperature at the associated sensor means equal to or greater than the desired maximum temperature for its associated bearing, motor or the like.

4. A monitor according to claim 2 further including a sensor identifying display means, and means including a counter circuit for driving said sensor identifying display means to produce an observable indication identifying the sensor being selected by the first multiplexer circuit means, and clock circuit means simultaneously actuating said first and second multiplexer circuit means and said counter circuit means.

5. A monitor according to claim 4 further including means for selectively disabling said counter circuit means when a first of said sensors is encountered whose temperature meets or exceeds the maximum desired temperature selected therefor.

6. A monitor according to claim 5 wherein said last mentioned means further includes means selectable to reactivate said counter circuit means following said disabling thereof.

7. A monitor according to claim 4 further including user accessible means for selectively disconnecting said clock means and manually activating said first and second multiplexer circuit means and said counter circuit means.

8. A monitor according to claim 4 including further circuit means coupled with said sensor identifying display means to identify a sensor at which a temperature at or in excess of the desired maximum is causing energization of the observable indicator means.

9. A bearing and motor temperature monitor according to claim 2 for use in a grain elevator or the like, and further comprising a housing, said display means and said observable indicator means being mounted on said housing, said first and second multiplexer circuit means, said adjustable reference means and said energizing means all comprising low level signal circuits and being mounted in said housing, AC derived DC power supply circuit means in said housing for energizing said low level circuit means, and means in said housing for physically and electrically isolating AC power from said low level signal circuit means to substantially avoid feeding of AC power to any circuit elements within the grain elevator.

10. A monitor according to claim 1 wherein said sensor means includes a plurality of temperature sensors each associated with one of said plurality of bearings and each comprising a temperature sensitive diode, a selected matching element for substantially equalizing the temperature response characteristic of the diode with that of the diode and matching element associated with each other sensor, a sensor housing, a highly thermoconductive potting material encasing the diode and matching element within the housing, and connecting means on said housing for holding the housing and associated sensor in close thermal contact with the associated bearing.

11. A monitoring system according to claim 10 wherein said matching element comprises a selected resistor.

12. A system for monitoring the temperature of a plurality of bearings, motors and the like, comprising: a plurality of sensor means each mounted for sensing the temperature at one of a plurality of bearings, motors and the like, first multiplexer circuit means for sequentially and repeatedly scanning said sensor means and responsive to each sensor means for producing a first signal having a value corresponding to the temperature sensed thereby, a plurality of adjustable reference means, each associated with one of said sensor means and individually and selectively adjustable for providing a second signal having a value corresponding to a maximum desired temperature for the one of said bearings, motors and the like at which the associated sensor means is mounted, second multiplexer circuit means for sequentially and repeatedly scanning said adjustable reference means in unison with said scanning by said first multiplexer circuit means of the associated sensor means, observable indicator means, and means responsive to said first signal and to said second signal for energizing said indicator means to produce an observable indication, wherein said observable indicator means includes temperature display means, and said energizing means includes display circuit means coupled with said temperature display means and with said first circuit means for receiving said first signal and energizing said temperature display means for producing an observable indication corresponding to the temperature at each sensor means, and further including sensor fault detecting circuit means interposed between said first multiplexer circuit means and said display circuit means for disabling said display circuit means to effect blanking of said temperature display means, in response to said first multiplexer circuit means encountering a sensor in an open circuit condition.

* * * * *

UNITED STATES PATENT AND TRADEMARK OFFICE
CERTIFICATE OF CORRECTION

PATENT NO. : 4,340,886
DATED : July 20, 1982
INVENTOR(S) : ROBERT R. BOLDT AND ARTHUR R. NELSON It is certified that error appears in the above-identified patent and that said Letters Patent are hereby corrected as shown below:

Column 3, line 59, change "detection" to --detector--;

Column 11, line 27, delete "means".

Signed and Sealed this

Twenty-first Day of September 1982

[SEAL]

Attest:

GERALD J. MOSSINGHOFF

Attesting Officer

Commissioner of Patents and Trademarks